W. P. ROBERTSON.
EGG OPENER.
APPLICATION FILED MAY 21, 1913. RENEWED FEB. 16, 1916.
1,199,114.                                    Patented Sept. 26, 1916.
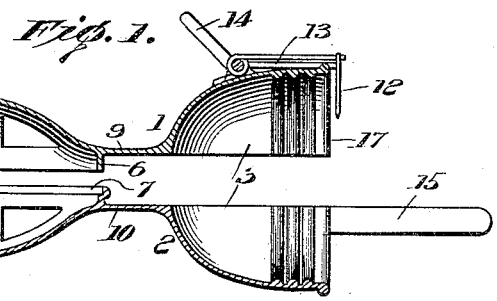
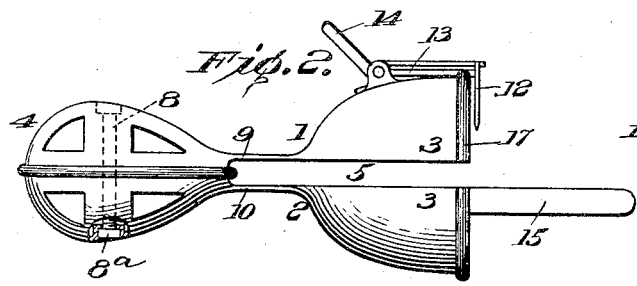   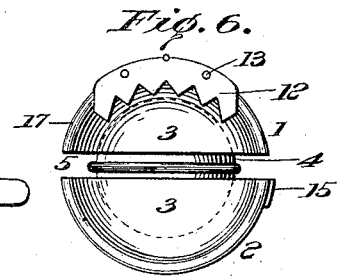
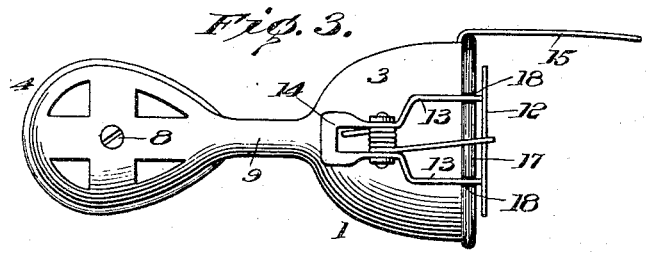   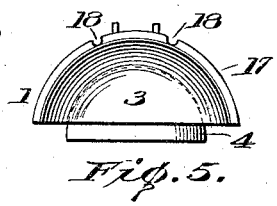
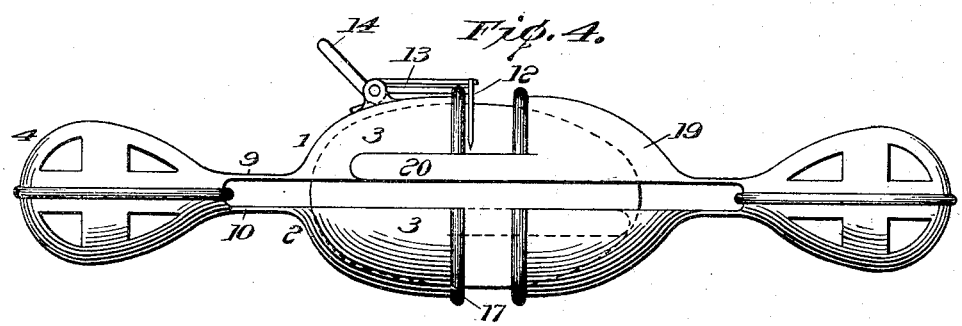
Witnesses:
Alan Franklin
Marion J. Balfour
Wm. P. Robertson, Inventor
By his Attorney

UNITED STATES PATENT OFFICE.

WILLIAM P. ROBERTSON, OF NEW YORK, N. Y.

EGG-OPENER.

1,199,114.  Specification of Letters Patent.  Patented Sept. 26, 1916.

Application filed May 21, 1913, Serial No. 769,080. Renewed February 16, 1916. Serial No. 78,776.

*To all whom it may concern:*

Be it known that I, WILLIAM P. ROBERTSON, of the city of New York, in the county of New York and State of New York, have invented certain new and useful Improvements in Egg-Openers; and I do hereby declare the following to be a full, clear, and exact description of the invention, such as will enable others skilled in the art to which it appertains to make and use the same.

The object of my invention is to provide improved, highly efficient and sanitary means for opening eggs, whether cooked or raw, whereby the operation may be completed without bringing the contents of the egg into contact with the hands.

As illustrated in the accompanying drawing, Figure 1 shows the parts constituting one of the coöperating members separated. Fig. 2 shows the same parts assembled. Fig. 3 is a top plan view. Fig. 4 shows the two coöperating members containing an egg and Figs. 5 and 6 are details.

Referring to the drawing, one of the coöperating members is illustrated in Figs. 1, 2 and 3. It is shown comprising two parts 1 and 2 adapted to be assembled as illustrated in Figs. 2 and 3. The part 3 of this member is of substantially semicircular formation to receive an egg and forward of the handle portion 4 the two parts are spaced as at 5 so that they may accommodate themselves to eggs of various sizes. I have shown the handle portion 4 of part 1 formed with a rim 6 adapted to be inserted into an annular groove 7 in the handle portion of the part 2. A threaded bolt 8 passes through the two handle members and receives a nut 8ª. Forward of the rim and flange 6, 7, the shank comprises the two spaced apart portions 9, 10, terminating in the semicircular part 3.

I have shown the part 1 equipped with a suitable cutter with which to pierce the shell of the egg. As shown this comprises a spring held jaw 12 mounted on arms 13 suitably fulcrumed and formed with a lever extremity 14 by which the operator may raise the jaw to permit of insertion of the egg. In the lower member 2 I have shown a blade 15 projecting forward and of any preferred material although obviously metal is most desired not only for this feature but for the entire device. The egg receiving portion 3 is preferably formed on its inner face with a plurality of corrugations to insure firm contact with the shell of the egg. See Fig. 1. The rim or flange 17 of part 1 is shown formed with notches 18 to receive the arms 13 of the cutter. See Fig. 5. The member 19, shown in Fig. 4, is substantially a duplicate of the one just described except that it need not be provided with a cutting jaw. It is however shown formed with a blade 20 corresponding to the blade 15. When the two elements are in position holding an egg these blades project respectively outside of the opposite member as shown in Fig. 4.

In practice the user holds one of the members in each hand. They are brought together with an egg between them. This may be very readily done without putting the hands into hot water when boiled eggs are being served. Owing to the resilient action between the parts comprising each member they will expand sufficiently to hold the egg shells securely and will readily adapt themselves to eggs of various sizes. The egg is held as shown in Fig. 4 and the user maintains the cutter handle 14 depressed until it is desired to break the egg when the handle is released and the cutter is actuated by its spring to break the egg shell. The shell may then be readily separated in two parts. Whether or not the substance of the egg readily empties depends upon the degree to which it may have been cooked. If the egg is hard boiled the two coöperating members are separated, each containing its portion of the egg, and the blade 15 is inserted into and around the shell of the egg within the member 19 to ream out the latter and the same function is performed by the blade 20 of the member 19.

It will be obvious from the foregoing that an egg may be readily handled without requiring direct manipulation by the hands and that simple and sanitary means is provided for this purpose, and that the device may be thoroughly cleaned without difficulty.

I claim as my invention:—

1. As an article of manufacture, an egg opener comprising two elements, each of said elements comprising two parts joined together at the handle and having spaced apart portions adapted to exert a resilient action upon an egg held between them and provided with a blade adapted to project outside of the coöperating element and adapted to ream out the contents of the shell held within the opposite element.

2. As an article of manufacture, an egg opener comprising two elements, each of said elements comprising two parts joined together at the handle and having spaced apart portions adapted to exert a resilient action upon and hold an egg between them, one of said elements being provided with a cutter.

3. As an article of manufacture, an egg opener comprising a cup formed of two parts adapted to exert a spring action upon an egg, and having a blade or reamer, for the purpose stated.

In testimony whereof, I have signed this specification in the presence of two subscribing witnesses.

WILLIAM P. ROBERTSON.

Witnesses:
GRAFTON L. McGILL,
MARION I. BALFOUR.

Copies of this patent may be obtained for five cents each, by addressing the "Commissioner of Patents, Washington, D. C."